United States Patent [19]

Lassota

[11] 4,431,356

[45] * Feb. 14, 1984

[54] HERMETIC REFRIGERATION ROTARY MOTOR-COMPRESSOR

[76] Inventor: Marek J. Lassota, 8657 W. Foster Ave., Chicago, Ill. 60656

[ * ] Notice: The portion of the term of this patent subsequent to Jan. 30, 1996 has been disclaimed.

[21] Appl. No.: 278,455

[22] Filed: Jun. 29, 1981

Related U.S. Application Data

[63] Continuation-in-part of Ser. No. 5,670, Jan. 22, 1979, abandoned, which is a continuation-in-part of Ser. No. 791,423, Apr. 27, 1977, Pat. No. 4,135,864, which is a continuation-in-part of Ser. No. 659,430, Feb. 19, 1976, abandoned, which is a continuation-in-part of Ser. No. 610,159, Sep. 4, 1975, Pat. No. 4,010,675, which is a continuation of Ser. No. 523,958, Nov. 14, 1974, abandoned.

[51] Int. Cl.[3] .......................... F01C 1/24; F01C 21/12; F04C 17/16; F16J 1/24

[52] U.S. Cl. ........................................ 418/1; 417/372; 417/415; 417/902; 418/83; 418/58; 418/142; 418/151

[58] Field of Search ............... 417/902, 372, 415, 460, 417/462-466; 418/1, 15, 54-60, 83, 142, 151, 160, 97; 123/42, 51 B; 91/96; 92/177

[56] References Cited

U.S. PATENT DOCUMENTS 3,279,683 10/1966 Kleinlein ........................ 417/902 X 4,137,021 1/1979 Lassota ................................ 418/1

*Primary Examiner*—Richard E. Gluck

*Attorney, Agent, or Firm*—Thomas W. Speckman

[57] ABSTRACT

A hermetic refrigeration rotary motor-compressor comprising a hermetically sealed pressure tight housing can enclosing a compressor unit comprising rotary cylinder-piston and piston elements journaled on eccentrics of two oppositely rotatable shafts, and a motor unit for driving the compressor unit having a rotor mounted on one of the compressor unit shafts, with a stator of the motor unit positioned in operative relation to the rotor of the motor unit. The piston and cylinder-piston form moveable walls, and two axially spaced walls form stationary walls of a compression chamber. An intake charge of refrigerant vapor may cool the motor unit and is admitted into the compression chamber through intake ports and discharged through a system of discharge valves into the discharge line.

15 Claims, 5 Drawing Figures

HERMETIC REFRIGERATION ROTARY MOTOR-COMPRESSOR

CROSS REFERENCE TO RELATED APPLICATIONS

This application is a continuation-in-part of my pending prior application Ser. No. 5,670, filed Jan. 22, 1979, now abandoned, which is a continuation-in-part of my prior application Ser. No. 791,423, filed Apr. 27, 1977, now U.S. Pat. No. 4,135,864, which is a continuation-in-part of my prior application Ser. No. 659,430, filed Feb. 19, 1976, now abandoned, which is a continuation-in-part of my earlier application Ser. No. 610,159, filed Sept. 4, 1975, now U.S. Pat. No. 4,010,675, which is a continuation of my prior application Ser. No. 523,958, filed Nov. 14, 1974, and now abandoned.

BACKGROUND OF THE INVENTION

This invention relates in general to a refrigeration compressor, and more particularly to a hermetic refrigeration rotary motor-compressor.

Reciprocating piston refrigeration hermetic motor-compressors are well known in the art. They possess, however, inherent disadvantages of having reciprocating motion of a piston causing high stresses in certain components, vibration, noise, and limiting their rotational speeds. Further, they must be equipped with suction valves complicating design, lowering efficiency and causing other numerous disadvantages.

Various types of rotary compressors have been proposed to replace the reciprocating piston compressors in the refrigeration, air conditioning and other systems, in order to overcome some of its disadvantages, and to realize new advantages. However, such efforts have not been fully successful and the reciprocating piston compressor is in widespread use in hermetic compressor-motor machines today.

SUMMARY OF THE INVENTION

The hermetic refrigeration rotary motor-compressor of this invention comprises generally a hermetically sealed pressure tight housing can enclosing a motor-compressor comprising an electric motor unit and a rotary compressor unit of my prior invention. The compressor unit comprises generally a pair of rotatable cylinder-piston and piston elements journaled on eccentric portions of two shafts, with the piston and cylinder-piston operatively positioned between two axially spaced walls. Both shafts are journaled in axially spaced walls and are interconnected by a gearing means to transmit power from a drive shaft to a driven shaft and to coordinate their movements in such a way so said shafts rotate in coordinated rotations in opposite directions and with equal speeds. The piston and cylinder-piston follow coordinated planetary movements in opposite directions with and about the eccentric portions of their shafts and form moveable walls of a compression chamber, whereas the stationary walls of the compression chamber are formed by the axially spaced walls. An intake charge of refrigerant vapor may be used to cool the motor unit and is admitted into the compression chamber through intake ports and discharged through a discharge valves.

The rotor of an electric motor is operatively mounted on one of the two shafts, and a stator of the motor is supported by suitable supporting means in operative relation to the rotor. The motor-compressor is also operatively positioned inside the housing can by suitable supporting means.

OBJECTS OF THE INVENTION

One object of the present invention is to provide a hermetic refrigeration rotary motor-compressor simple in construction, compact and lightweight.

Another object of the present invention is to provide a hermetic refrigeration rotary motor-compressor having an intake system with intake ports and a discharge system with discharge valves.

Yet another object of the present invention is to provide a hermetic refrigeration rotary motor-compressor capable of well balanced operation over wide range of RPM.

Still another object of the present invention is to provide a hermetic refrigeration rotary motor-compressor capable of long and trouble-free service life.

These and other objects of the present invention will become apparent when reading the annexed detailed description in view of the drawings.

DETAILED DESCRIPTION OF THE INVENTION

Figure 1:
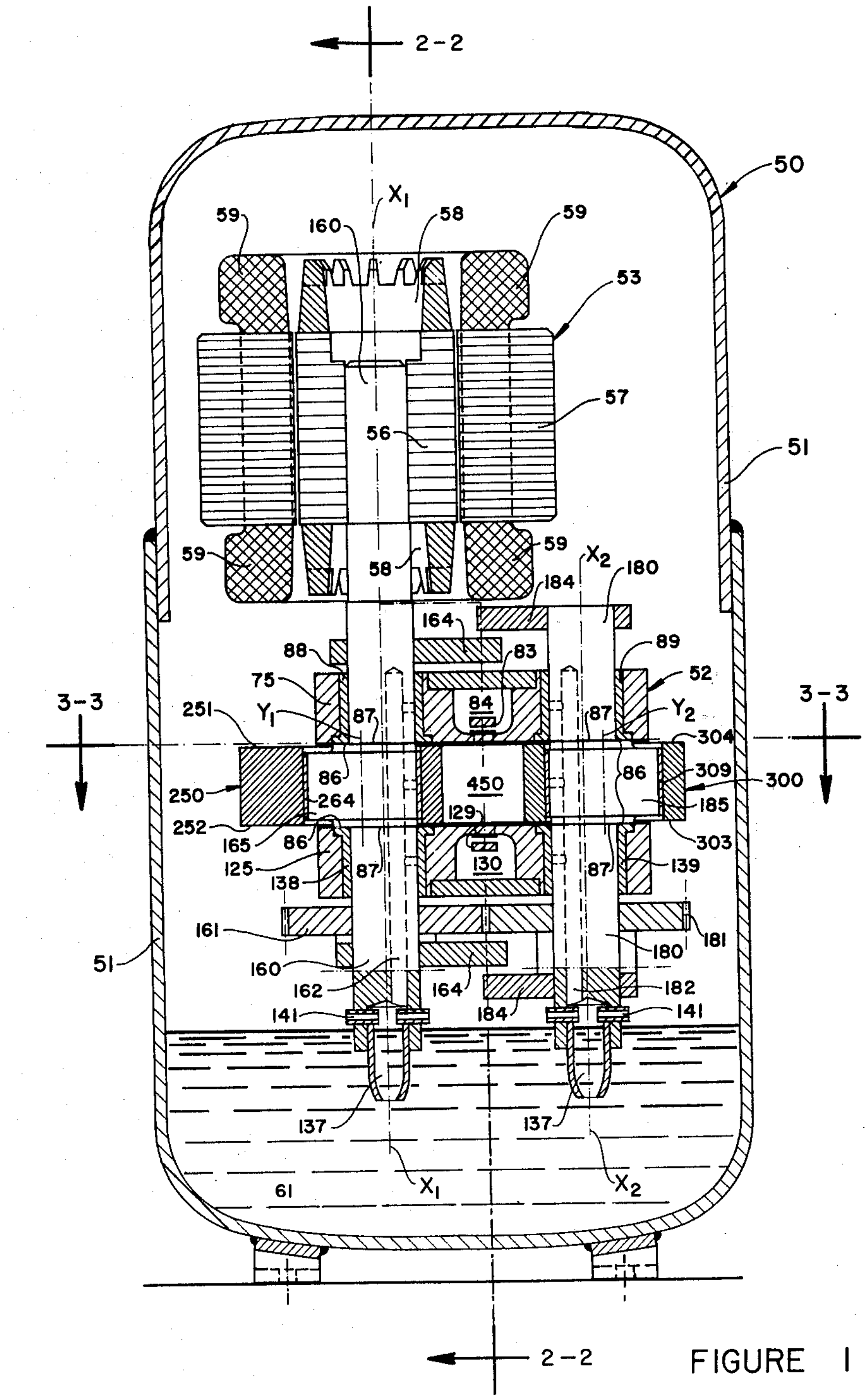
FIG. 1 is a vertical sectional view through a hermetic refrigeration rotary motor-compressor embodying this invention, taken along lines 1—1 in FIGS. 2, 3 and 4.

Referring first to FIGS. 1, 2, 3 and 4 of the drawings, a hermetic refrigeration rotary motor-compressor according to one embodiment of the invention is indicated generally by numeral 50. Hermetic motor-compressor 50 comprises hermetically sealed pressure tight housing can 51 within which compressor unit 52 coupled with electric motor unit 53 is operatively positioned by supporting means 54, best seen in FIG. 2.

Compressor unit 52 comprises cylinder-piston 250 and piston 300 journaled on eccentric portions 165 and 185 of shafts 160 and 180 rotatable in opposite directions, and two walls 75 and 125 having surfaces 76 and 126 axially spaced by spacers 150. Spaced walls 75 and 125 form stationary walls of compression chamber 450, and portions of surfaces 76 and 125 of spaced walls 75 and 125 define stationary surfaces of compression chamber 450. Axially spaced walls 75 and 125 are fastened by suitable fastening means, as for example bolts 60. In the design as illustrated in FIGS. 1, 2, 3 and 4 bolts 60 fasten walls 75 and 125 and are located inside of spacers 150, spacing walls 75 and 125 axially along axes $X_1$—$X_1$ and $X_2$—$X_2$ of shafts 160 and 180.

Figure 2:
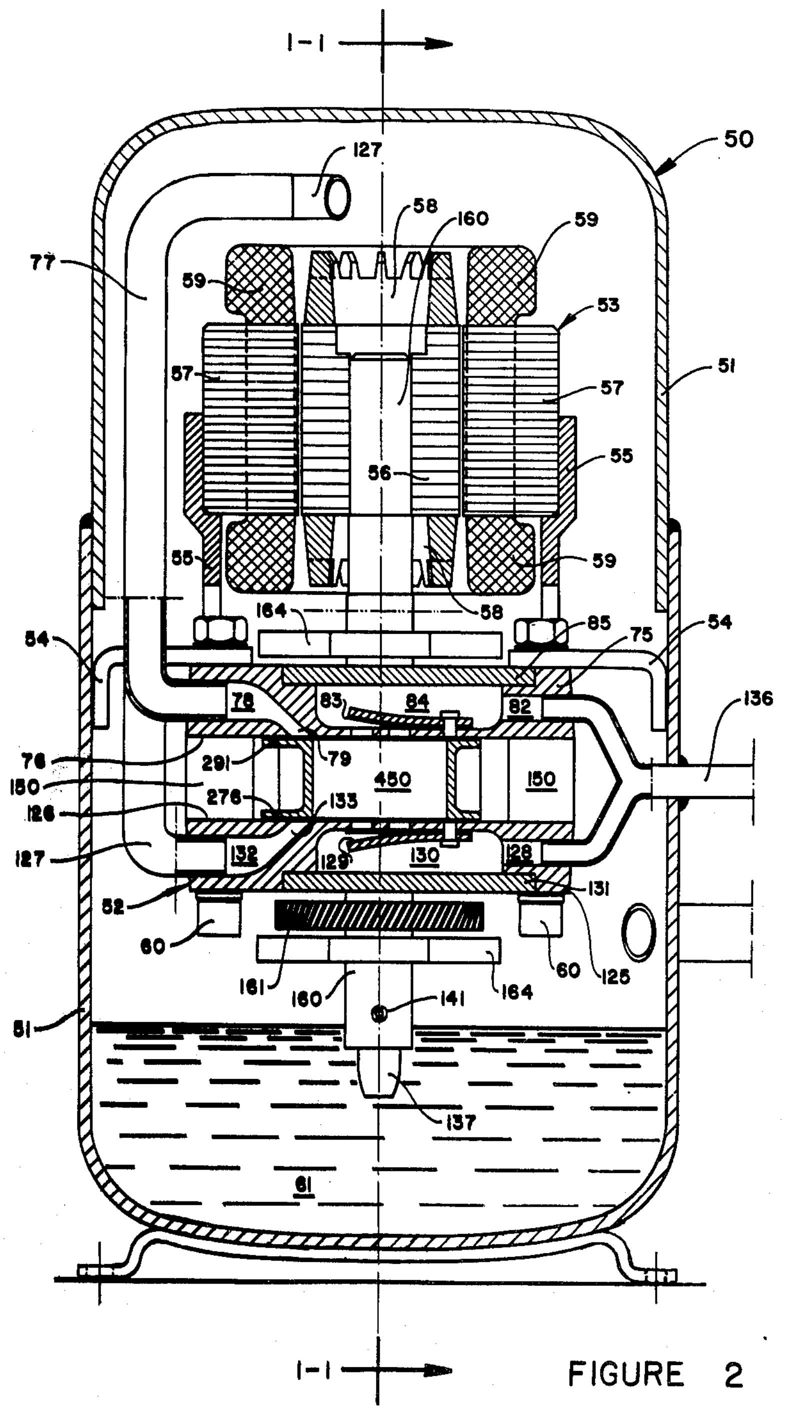
FIG. 2 is a vertical sectional view through a hermetic refrigeration rotary motor-compressor of this invention, taken along lines 2—2 of FIGS. 1, 3 and 4 and showing intake and discharge systems of this compressor.
Figure 3:
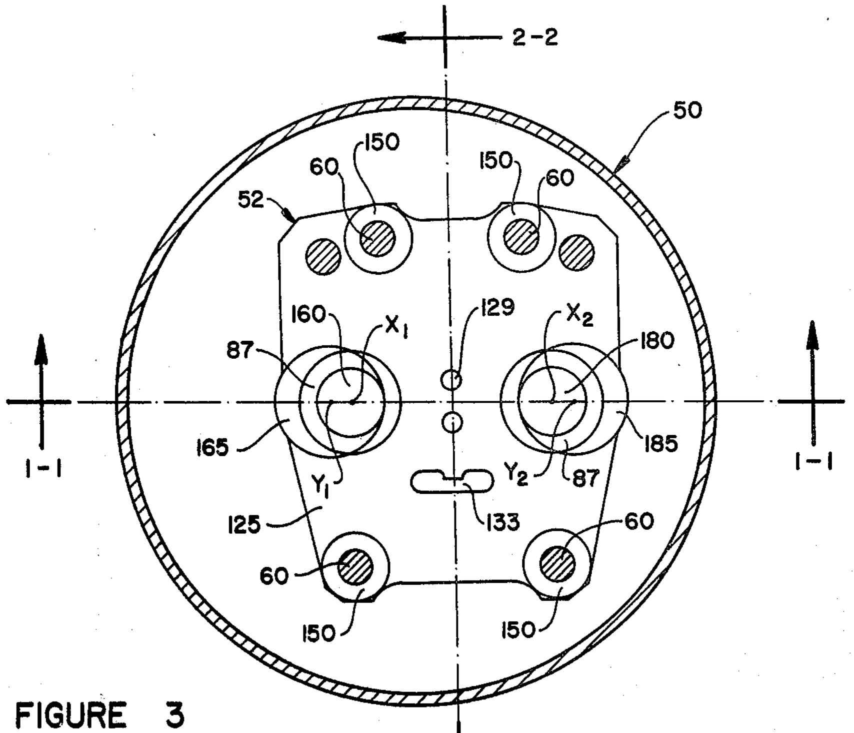
FIG. 3 is a longitudinal sectional view taken along line 3—3 of FIG. 1 and showing one of two axially spaced walls with their spacers and both shafts in place.

Internal structures of axially spaced walls 75 and 125 are best shown in FIGS. 1 and 2. Wall 75 has channel 78 communicating with compression chamber 450 through suitable intake port 79, and discharge channel 82 connected with compression chamber 450 by suitable discharge valve or valves 83 located in discharge valve chamber 84. Wall 125 has intake channel 132 communicating with compression chamber 450 through suitable intake port 133, and discharge channel 128 connected with compression chamber 450 by suitable discharge valve or valves 129 located in chamber 130. Both discharge valve chambers 84 and 130 are sealed by suitable covers 85 and 131.

In the embodiment illustrated, the intake and discharge systems are shown in both spaced walls 75 and 125. However, any suitable combination of the intake and discharge systems in one or both axially spaced walls can be used.

Intake port or ports can be of any shape and size as suitable for desired operating characteristics of the compressor.

Figure 5:
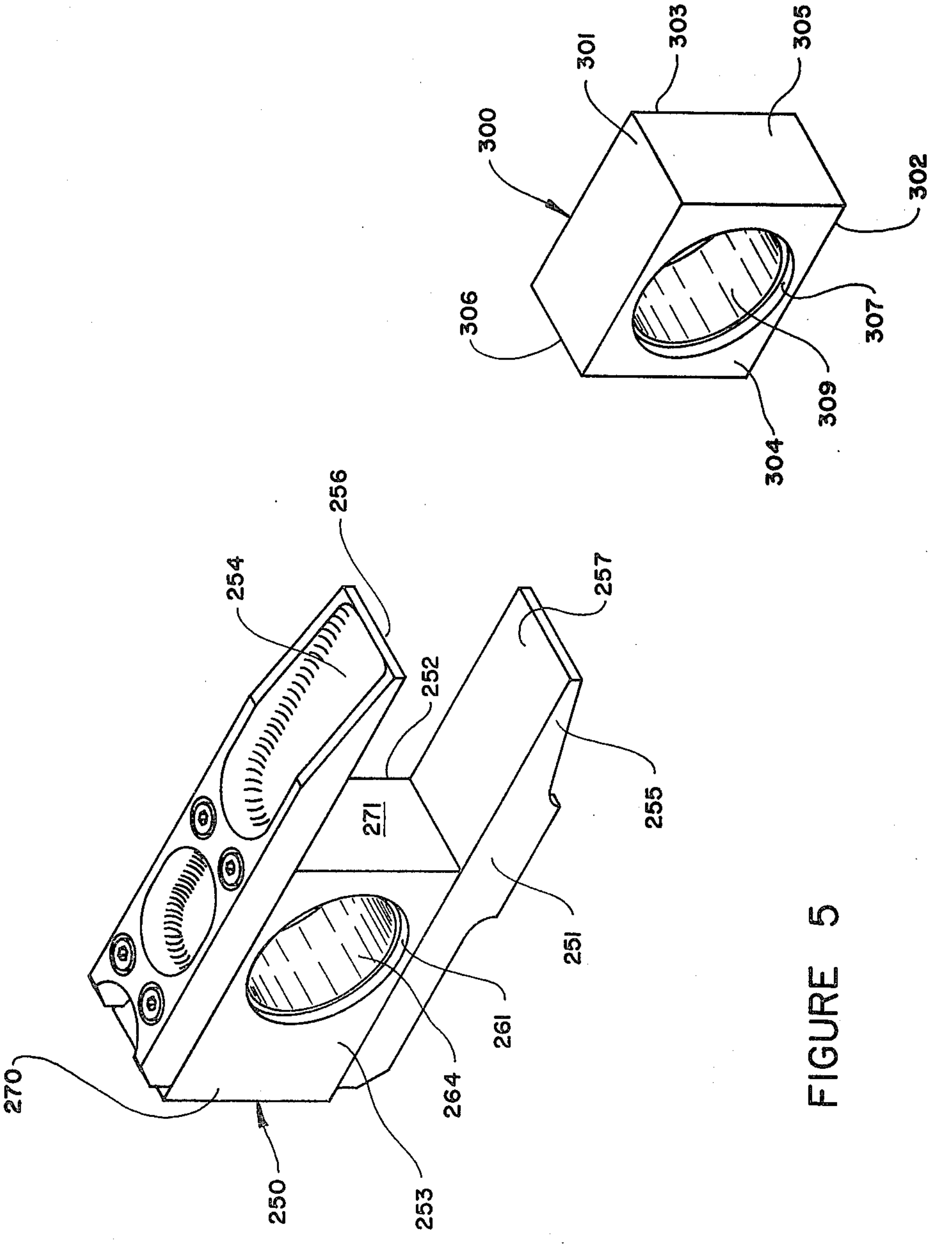
FIG. 5 is a perspective view of the cylinder-piston and piston elements.

Cylinder-piston 250 is best shown in view of FIG. 5. The term "cylinder-piston" refers to an element operating as both a cylinder and a piston, although the configuration of this element is not at all geometrically cylindrical.

Cylinder-piston 250 comprises body 253 and spaced arms 254 and 255 having opposing parallel surfaces 256 and 257 and forming a U-shaped opening for a piston. Bearing 264 is located in passageway 261 of body 253. Portion 270 of body 253, remote from spaced arms 254 and 255 and sufficiently large acts as a balancing element to balance cylinder-piston 250 by making a center of gravity of cylinder-piston 250 located on or close to axis $Y_1$—$Y_1$ common for bearing 264 and eccentric portion 165 of shaft 160.

Body 253 at the end adjacent to spaced arms 254 and 255 has surface 271 connecting two side faces 251 and 252, and further connecting opposing parallel surfaces 256 and 257 of spaced arms 254 and 255. Surfaces 256, 257 and 271 form three of four moveable surfaces of compression chamber 450.

FIG. 5 shows also piston 300 with its bearing 309. Piston 300 has spaced side faces 303 and 304 interconnected by passageway 307 in which bearing 309 is located. Piston 300 has also a pair of spaced faces 301 and 302 and pair of end faces 305 and 306. End face 306 connects spaced side faces 303 and 304 and spaced faces 301 and 302 and form fourth moveable surface of compression chamber 450, changing the volume of compression chamber 450 during the operation of the compressor.

The width of piston 300, measured along axis $Y_2$—$Y_2$ of its bearing 309 is coextensive with the width of cylinder-piston, measured along axis $Y_1$—$Y_1$ of its bearing 264.

Due to its symmetrical shape piston 300 can be readily balanced to have its center of gravity located on or close to the axis $Y_2$—$Y_2$ which is common for bearing 309 and eccentric portion 185 of shaft 180.

Figure 4:
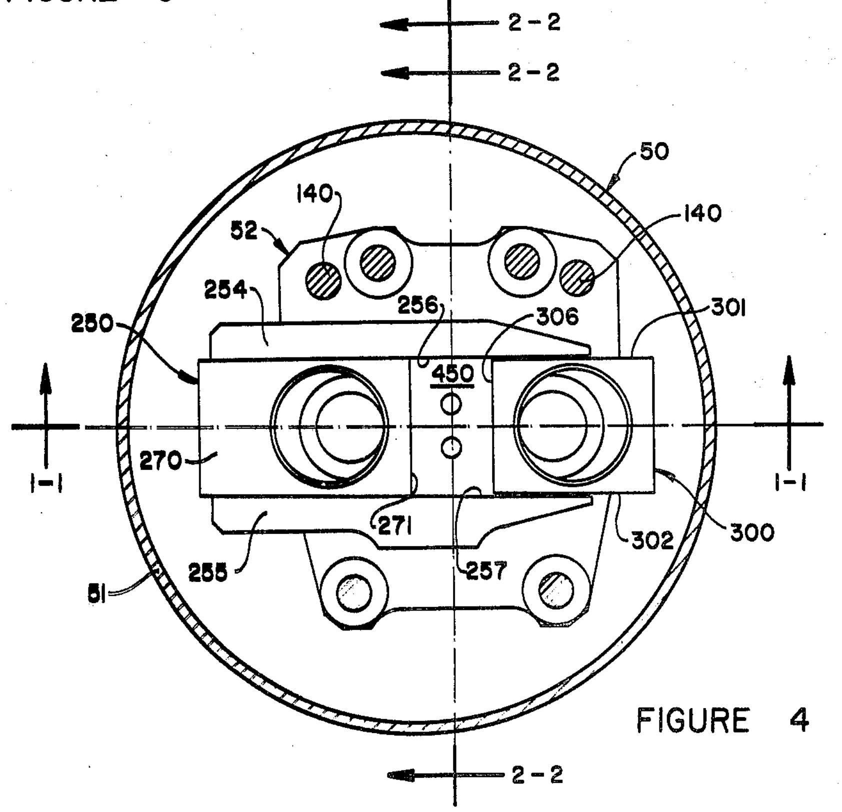
FIG. 4 is a longitudinal sectional view taken along line 3—3 of FIG. 1 and showing the same of two axially spaced walls with their spacers, shafts and piston and cylinder-piston elements assembled.

Assembled compressor unit 52 of the embodiment illustrated is best seen in FIGS. 1, 2, 3 and 4. Cylinder-piston 250 is journaled on eccentric portion 165 of shaft 160; piston 300 is journaled on eccentric portion 185 of shaft 180 and is slidably positioned between spaced arms 254 and 255 of cylinder-piston 250, which form a U-shaped opening for piston 300. This is best seen in FIG. 4.

Shafts 160 and 180 are journaled in suitable bearings 88, 89, 138 and 139 located in spaced walls 75 and 125. Bearings 88 and 138 journal shaft 160, and bearings 89 and 139 journal shaft 180. Shafts 160 and 180 are spaced for meshing of gears 161 and 181 and are rotating around axes $X_1$—$X_1$ and $X_2$—$X_2$. This is best seen in view of FIG. 1.

Vertically positioned shafts 160 and 180 are supported axially to keep them in operative relation to other components of compressor unit 52. One way to axially support shafts 160 and 180 is to have a thrust bearing surfaces 86 as portions of bearings 88, 89, 138 and 139, with side journal surfaces 87 of eccentrics 165 and 185 disposed between and adjacent to bearing thrust surfaces 86. Thrust surfaces 86 of bearings 88, 89, 138 and 139 may have suitable grooves to distribute lubricant on thrust surfaces 86.

Separate shaft bearings 88, 89, 138 and 139 and cylinder-piston and piston bearings 264 and 309, as shown in the embodiment illustrated, can be replaced by suitable bearings machined directly in axially spaced walls 75 and 125 and in cylinder-piston body 253 and piston 300 if elements 75, 125, 253 and 300 are made of material having suitable bearing properties. For example, one such material can be suitable grade of cast iron. Bearing means suitable for all of the bearings of the compressor may be separate press fit or directly machined bearings or mixtures of such different types of bearings.

Axially spaced walls 75 and 125 with bearings journaling shafts 160 and 180 should be aligned by suitable means, as for example suitable dowel pins 140.

An electric motor unit 53 of the embodiment illustrated is also best seen in FIGS. 1 and 2. Rotor 56 is shown operatively mounted on cylinder-piston shaft 160. Stator 57 is supported in operative relation to rotor 56 by means of stator support 55, which is best seen in view of FIG. 2. Fan-like portions 58 of rotor 56 may force the intake refrigerant charge through the gap between rotor 56 and stator 57 and around motor windings 59 to cool electric motor unit 53 and to separate the intake refrigerant charge from any liquids that may be present, such as liquid refrigerant or oil. Dry intake refrigerant charge may then be routed into intake channels 82 and 128 of axially spaced walls 75 and 125 by suitable intake manifolds 77 and 127, best shown in FIG. 2.

Electric motor unit 53 may be connected to any suitable source of electric power in any suitable manner.

Shafts 160 and 180 are dynamically balanced by suitable balancing elements 164 and 184 secured to shafts 160 and 180. Balanced shafts 160 and 180 have their centers of gravity located on or sufficiently close to their axes of rotation $X_1$—$X_1$ and $X_2$—$X_2$, as required for balanced operation of a rotary compressor, or motor-compressor of this invention.

Suitably designed and shaped rotor 56 of electric motor unit 53 may also be used as a balancing element instead of top balancing element 164 of shaft 160 to balance shaft 160.

Shafts 160 and 180 are interconnected by suitable gears 161 and 181 to transmit power from a drive shaft to a driven shaft and to coordinate their rotations and rotate in coordinated rotations in opposite directions with equal speeds. Cylinder-piston 250 and piston 300 follow coordinated planetary rotations in opposite directions with and about eccentric portions 165 and 185 of shafts 160 and 180. Spaced faces 301 and 302 of piston 300 are disposed adjacent to opposing parallel surfaces 256 and 257 of spaced arms 254 and 255. Side face 251 of cylinder-piston 250 and spaced side face 304 of piston 300 are adjacent to surface 76 of wall 75. Likewise, side face 252 of cylinder-piston 250 and spaced side face 303 of piston 300 are disposed adjacent to surface 126 of wall 125. Surfaces 256, 257 and 271 of cylinder-piston 250 and end face 306 of piston 300 form moveable surfaces of compression chamber 450. Movement of surface 306 of piston 300 with respect to surfaces 256, 257 and 271 of cylinder-piston 250 changes the volume of variable volume compression chamber 450.

During the operation of the hermetic refrigeration rotary motor-compressor of this invention intake ports 79 and 133 are periodically opened and closed by cylinder-piston 250 and piston 300 to allow for required flow of intake refrigerant charge into compression chamber 450. Intake ports 79 and 133 are opened by cylinder-piston 250 and piston 300 when compression chamber 450 is at about its minimum volume, and are closed by cylinder-piston 250 when compression chamber 450 is at about its maximum volume.

For efficient operation of the rotary motor-compressor embodying this invention, compression chamber 450 of compressor unit 52 should be sealed. One solution of seal compression chamber 450 is to sealingly engage all moveable and stationary elements forming compression chamber 450. Such sealing engagement between spaced sides 301 and 302 of piston 300 disposed adjacent to opposing parallel surfaces 256 and 257 of walls 254 and 255 of cylinder-piston 250; between side face 251 of cylinder-piston 250 and spaced side face 304 of piston 300 adjacent to surface 76 of wall 75, and between side face 252 of cylinder-piston 250 and spaced side face 303 of piston 300 adjacent to surface 126 of axially spaced wall 125 can result from a combination of suitable running clearances between these elements, suitable finish of their coacting surfaces, use of lubricant of suitable viscosity and suitable rotational speed of the motor-compressor unit.

However, any suitable sealing system different from above described can be used to seal compression chamber 450 without departing from the spirit of this invention. Also, housing can 51, a pressure tight vessel, can be pressurized to a certain desired pressure to minimize leakage from compression chamber 450 into the inside of housing can 51 regardless of the type of sealing system used to seal compression chamber 450.

Flanges 291 and 276 of arm 255 of cylinder-piston 250 seal intake ports 79 and 133 from contact with the inside of housing can 51, so only dry refrigerant vapor from suction manifolds 77 and 127 is allowed to enter compression chamber 450.

However, the motor-compressor of this invention, in certain applications, may operate without sealing of intake ports 79 and 133. Also, in some applications, intake channels 78 and 128 can be connected with the inside of housing can 51 in any desired way.

All coactin surfaces 251, 252, 256 and 257 of cylinder-piston 250; 301, 302, 303 and 304 of piston 300, and surfaces 76 and 126 of axially spaced walls 75 and 125 must be sufficiently wear resistant as required for desired operating characteristics and life of the compressor unit. This can be realized by use of suitable materials for aforementioned elements, and suitable hardness, finish and lubrication of their coacting surfaces.

Bearings of the compressor unit 52 of hermetic motor-compressor 50 of this invention can be lubricated by any lubricant suitable for operation in a refrigeration systems. Lubricant may be delivered to the bearings by suitable delivery lines located in shafts 160 and 180. The lubricant can be the same as lubricating gears 161 and 181 and coacting surfaces of cylinder-piston 250 and piston 300 and spaced walls 75 and 125. Lubricant from suitable reservoir 61 can be distributed to lubricate bearings and other coacting surfaces by aby suitable splash, gravity or pump-fed lubricating system. Centrifugal pumps 137 fed lubricating system is shown in the embodiment illustrated in FIG. 1 in each of the shafts 160 and 180, where each of pumps 137 is shown equipped with oil-refrigerant separators 141. Pumps 137 supply pressurized lubricant from lubricant reservoir 61 through suitable channels 162 and 182 of shafts 160 and 180 to lubricate bearings 88, 89, 138, 139, 264 and 309 and other coacting surfaces of compressor unit 52.

Motor-compressor unit 52 is operatively positioned inside housing can 51 by suitable supporting means 54 positioning motor-compressor unit in such a way so centrifugal pumps 137 of shafts 160 and 180 are immersed in lubricant of lubricant reservoir 61.

Lubricant used to lubricate coacting surfaces of compressor unit 52 can also be used as a cooling medium to cool components of the compressor.

The hermetic refrigeration rotary motor-compressor of this invention can be constructed of any suitable materials dependent upon the particular use desired, and can be powered by any suitable prime mover, as for example any suitable electric motor as in the embodiment illustrated.

THE OPERATION OF THE INVENTION

The features and operation of the compressor unit 52 of the hermetic refrigeration rotary motor-compressor of this invention are more fully described in my U.S. patent application Ser. No. 791,423, filed Apr. 27, 1977, issued as U.S. Pat. No. 4,135,864 on Jan. 23, 1979, the disclosure of which is incorporated in its entirety herein by reference, and all skilled in the art will readily apply such description of the operation in describing the operation of compressor unit 52 of the hermetic rotary refrigeration motor-compressor of this invention.

It is understood that the inside of housing can 52 of the hermetic refrigeration rotary motor-compressor disclosed herein can be connected to an appropriate source of suitable refrigerant vapor, and that discharge channels 82 and 128 can be connected by suitable discharge manifold 136 to an appropriate receiver of compressed refrigerant vapor.

While in the foregoing specification this invention has been described in relation to certain preferred embodiments thereof, and many details have seen set forth for purpose of illustration, it will be apparent to those skilled in the art that the invention is susceptible to additional embodiments and that certain of the details described herein can be varied considerably without departing from the basic principles of the invention.

I claim:

1. A hermetic refrigeration rotary motor-compressor comprising:
   - a compressor unit operatively positioned inside said hermetically sealed pressure tight housing can, said compressor unit comprising:
     - a cylinder-piston comprising a body and spaced arms extending from one end of said body, said spaced arms having opposing parallel surfaces and forming with said body of said cylinder-piston a U-shaped opening;
     - said cylinder-piston further comprising bearing means located in said body of said cylinder-piston and having two side faces;

- a piston positioned within said U-shaped opening of said cylinder-piston and having spaced faces adjoining said opposing parallel surfaces of said spaced arms of said cylinder-piston;
- said piston further comprising bearing means and having two spaced side faces;
- two walls;
- spacing means axially spacing said two walls to said axially spaced walls adjoin said side faces of said cylinder-piston and said spaced side faces of said piston;
- a rotatable cylinder-piston shaft comprising an eccentric portion journaled in said bearing means located in said body of said cylinder-piston;
- a rotatable piston shaft comprising an eccentric portion journaled in said bearing means located in said piston;
- said two axially spaced walls further comprising bearing means for journaling of said rotatable cylinder-piston and said piston shafts;
- gearing means interconnecting said cylinder-piston shaft and said piston shaft so said shafts follow coordinated rotations in opposite directions and said cylinder-piston and said piston follow coordinated planetary rotations in opposite directions with and around said eccentric portions of said shafts;
- said cylinder-piston and said piston forming moveable surfaces, and said axially spaced walls forming stationary surfaces of a compression chamber located between said body of said cylinder-piston and said piston and varying in volume upon said coordinated planetary rotations in opposite directions of said cylinder-piston and said piston;
- intake means comprising an intake port leading to said compression chamber;
- discharge means comprising a discharge valve and leading from said compression chamber;
- balancing means;
- lubricating means;
- a hermetically sealed pressure tight housing can;
- a support for supporting said compressor unit in operative position inside said hermetically sealed pressure tight housing can; and, a motor unit for driving said compressor unit, comprising:

- a rotor operatively attached to one of said cylinder-piston or said piston shafts;
- a stator; and,
- a supporting means for supporting said stator of said motor unit in operative relation to said rotor of said motor unit and to said compressor unit.

2. The hermetic refrigeration rotary motor-compressor of claim 1 wherein said gearing means comprise gears interconnecting said cylinder-piston and said piston shafts and having equal number of teeth so said shafts rotate with equal rotational speeds in opposite directions.

3. The hermetic refrigeration rotary motor-compressor of claim 1 wherein said balancing means comprise cylinder-piston balancing means comprising cylinder-piston balancing portion located in a part of said body of said cylinder-piston remote from said spaced walls, said balancing portion making the center of gravity of said cylinder-piston located on or close to the axis of said bearing located in said body of said cylinder-piston; and wherein said balancing means comprise piston balancing means, said piston balancing means being such design of said piston so said piston has its center of gravity located on or close to the axis of said bearing means located in said piston; and wherein said balancing means further comprise cylinder-piston shaft and piston shaft balancing means, said last mentioned means comprising balancing elements secured to said shafts and dynamically balancing said shafts with all elements assembled and journaled on said shafts.

4. The hermetic refrigeration rotary motor-compressor of claim 1 wherein said cylinder-piston, said piston and said axially spaced walls are sealingly engaged in forming said compression chamber.

5. The hermetic refrigeration rotary motor-compressor of claim 4 wherein said sealing engagement between said cylinder-piston, said piston and said axially spaced walls results from a combination of suitable running clearances between said cylinder-piston and said piston and between said cylinder-piston, said piston and said axially spaced walls, suitable finish of coacting surfaces of said cylinder-piston, coacting surfaces of said piston and coacting surfaces of said axially spaced walls, and use of lubricant of suitable viscosity to lubricate said coacting surfaces of said cylinder-piston, said piston and said axially spaced walls.

6. The hermetic refrigeration rotary motor-compressor of claim 1 wherein said intake means leading to said compression chamber comprise at least one intake port located in one of said axially spaced walls, said intake port being periodically opened and closed by said cylinder-piston and said piston to allow for required flow of intake charge into said compression chamber.

7. The hermetic refrigeration rotary motor-compressor of claim 6 wherein said intake port is opened by said cylinder-piston and said piston when said compression chamber is at about its minimum volume, and wherein said intake port is closed by said cylinder-piston when said compression chamber is at about its maximum volume.

8. The hermetic refrigeration rotary motor-compressor of claim 1 wherein said discharge means leading from said compression chamber comprise at least one discharge valve located in at least one of said axially spaced walls.

9. The hermetic refrigeration rotary motor-compressor of claim 1 wherein said lubricating means comprise a lubricant reservoir containing suitable lubricant lubricating said bearings of said cylinder-piston shaft, said bearings of said piston shaft, coacting surfaces of said cylinder-piston, said piston and said axially spaced walls, and further lubricating said gears interconnecting said cylinder-piston and said piston shafts.

10. The hermetic refrigeration rotary motor-compressor of claim 9 wherein said lubricating means further comprise oil pumps located in said cylinder-piston shaft and said piston shaft, pumping said lubricant through channels located in said cylinder-piston and said piston shafts to lubricate said bearings of said cylinder-piston shaft and said piston shaft and said coacting surfaces of said cylinder-piston, said piston and said axially spaced walls.

11. The hermetic refrigeration rotary motor-compressor of claim 10 wherein said oil pumps located in said cylinder-piston shaft and said piston shaft are centrifugal oil pumps.

12. The hermetic refrigeration rotary motor-compressor of claim 10 wherein said lubricating means further comprises oil-refrigerant separators located between said oil pumps and said channels delivering said lubricant to said bearing means of said cylinder-piston and said piston shafts, and to said coacting surfaces of said cylinder-piston, said piston and said axially spaced walls.

13. The hermetic refrigeration rotary motor-compressor of claim 10 wherein said motor-compressor unit is supported inside said hermetically sealed pressure tight housing can in such a way so said oil pumps located in said cylinder-piston shaft and said piston shaft are immersed in said lubricant contained in said lubricant reservoir.

14. The hermetic refrigeration motor-compressor of claim 1 wherein said bearing means comprise separate press-fit bearings.

15. The hermetic refrigeration motor-compressor of claim 1 wherein said bearing means comprise directly machined bearings.

* * * * *